United States Patent
Mustapha et al.

(10) Patent No.: US 12,551,206 B1
(45) Date of Patent: Feb. 17, 2026

(54) DEVICE WITH FEATURES FOR ROTATIONAL ATHERECTOMY AND LITHOTRIPSY

(71) Applicant: Cardio Flow, Inc., St. Paul, MN (US)

(72) Inventors: Jihad A. Mustapha, Ada, MI (US); Gary M. Petrucci, Long Lake, MN (US); Cassandra Ann Piippo Svendsen, Blaine, MN (US); Ryan D. Welty, Blaine, MN (US); Peter Samo Dovgan, Rockledge, FL (US)

(73) Assignee: Cardio Flow, Inc., St. Paul, MN (US)

( * ) Notice: Subject to any disclaimer, the term of this patent is extended or adjusted under 35 U.S.C. 154(b) by 0 days.

(21) Appl. No.: 19/215,654

(22) Filed: May 22, 2025

Related U.S. Application Data

(60) Provisional application No. 63/700,194, filed on Sep. 27, 2024.

(51) Int. Cl.
*A61B 17/00* (2006.01)
*A61B 17/22* (2006.01)
*A61B 17/3207* (2006.01)
*A61B 17/32* (2006.01)

(52) U.S. Cl.
CPC .. *A61B 17/00234* (2013.01); *A61B 17/22012* (2013.01); *A61B 17/320758* (2013.01); *A61B 2017/00238* (2013.01); *A61B 2017/00305* (2013.01); *A61B 2017/00353* (2013.01); *A61B 2017/00398* (2013.01); *A61B 2017/00557* (2013.01); *A61B 2017/00929* (2013.01); *A61B 2017/22025* (2013.01); *A61B 2017/22064* (2013.01); *A61B 2017/22065* (2013.01); *A61B 2017/320004* (2013.01); *A61B 2017/320766* (2013.01)

(58) Field of Classification Search
CPC ........ A61B 17/00234; A61B 17/22012; A61B 17/320758; A61B 2017/00238; A61B 2017/00305; A61B 2017/00353; A61B 2017/00398; A61B 2017/00557; A61B 2017/00929; A61B 2017/22025; A61B 2017/22064; A61B 2017/22065; A61B 2017/320004; A61B 2017/320766
USPC .......................................................... 606/1
See application file for complete search history.

(56) References Cited

U.S. PATENT DOCUMENTS

| | | |
|---|---|---|
| 12,193,702 B1 | 1/2025 | Mustapha et al. |
| 12,220,146 B2 | 2/2025 | Robinson et al. |
| 12,226,119 B2 | 2/2025 | Benjamin et al. |

(Continued)

FOREIGN PATENT DOCUMENTS

| | | |
|---|---|---|
| CN | 111768403 A | 10/2020 |
| EP | 4342382 A1 | 3/2024 |

(Continued)

OTHER PUBLICATIONS

International Search Report and Written Opinion in International Appln. No. PCT/US2025/030564, mailed on Sep. 22, 2025, 14 pages.

*Primary Examiner* — Aaron F Roane
(74) *Attorney, Agent, or Firm* — Fish & Richardson P.C.

(57) ABSTRACT

Some embodiments of a rotational atherectomy and lithotripsy system can partially or completely remove a stenotic lesion in blood vessels by rotating one or more abrasive elements to abrade and breakdown the lesion, by emitting acoustic energy to fracture and breakdown the lesion, or a combination of both.

20 Claims, 10 Drawing Sheets

(56) References Cited

U.S. PATENT DOCUMENTS

| | | |
|---|---|---|
| 12,295,612 B2 | 5/2025 | Kallok et al. |
| 12,310,617 B2 | 5/2025 | Piippo Svendsen et al. |
| 12,357,340 B2 | 7/2025 | Piippo Svendsen et al. |
| 2006/0265000 A1 | 11/2006 | Azizi |
| 2014/0100585 A1* | 4/2014 | Anderson ........ A61B 17/22012 606/128 |
| 2014/0180317 A1 | 6/2014 | Shturman |
| 2019/0269426 A1 | 9/2019 | Hakala et al. |
| 2022/0133345 A1 | 5/2022 | Kallok et al. |
| 2023/0116977 A1* | 4/2023 | Robinson ....... A61B 17/320725 606/159 |
| 2023/0240707 A1* | 8/2023 | Piippo Svendsen ........................ A61B 17/320758 623/2.11 |
| 2024/0197275 A1 | 6/2024 | Min |
| 2024/0206896 A1 | 6/2024 | Ingersoll et al. |

FOREIGN PATENT DOCUMENTS

| | | |
|---|---|---|
| WO | WO 2022/182645 A1 | 9/2022 |
| WO | WO 2024/061606 A1 | 3/2024 |
| WO | WO 2024/081361 A1 | 4/2024 |
| WO | WO 2024/167914 A1 | 8/2024 |

* cited by examiner

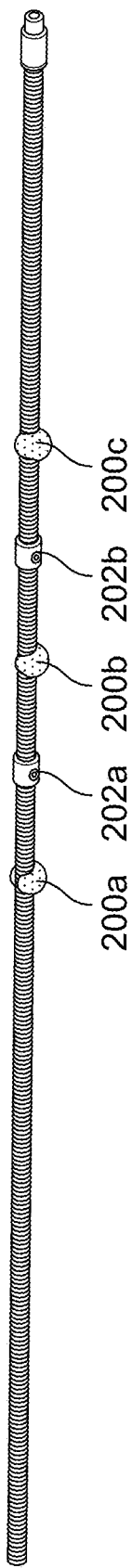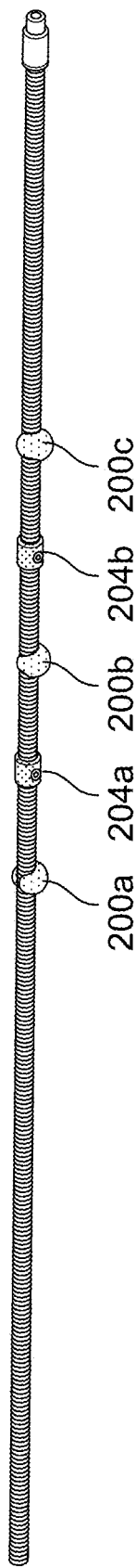
FIG. 2A
FIG. 2B

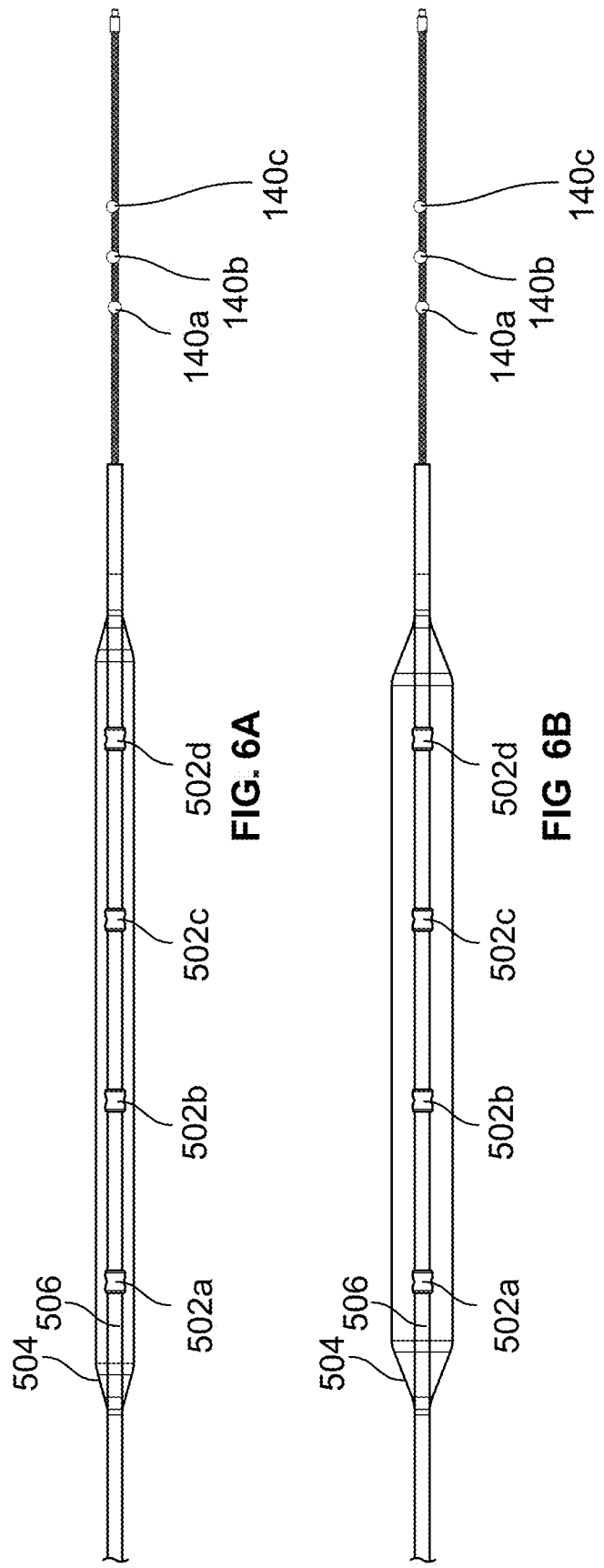

DEVICE WITH FEATURES FOR ROTATIONAL ATHERECTOMY AND LITHOTRIPSY

CROSS-REFERENCE TO RELATED APPLICATIONS

This application claims priority to U.S. Provisional Application Ser. No. 63/700,194 filed on Sep. 27, 2024, the contents of this aforementioned application being fully incorporated herein by reference.

TECHNICAL FIELD

This document relates to devices and systems for removing or reducing stenotic lesions in blood vessels, for example, by urging one or more abrasive elements in an orbital motion within the vessel and/or to applying ultrasonic energy or shockwaves to remove (partially or completely) the stenotic lesion material.

BACKGROUND

Atherosclerosis, the clogging of arteries with plaque, is often a result of coronary heart disease or vascular problems in other regions of the body. Plaque can be formed from fat, cholesterol, calcium, and other substances found in the blood. Over time, the plaque hardens and narrows the arteries. This limits the flow of oxygen-rich blood to organs and other parts of the body.

Blood flow through the central and peripheral arteries (e.g., carotid, iliac, femoral, renal, etc.) can be similarly affected by the development of atherosclerotic blockages. For example, peripheral artery disease (PAD) can be serious because without adequate blood flow, the kidneys, legs, arms, and feet may suffer irreversible damage. Left untreated, the tissue may die or harbor infection. In another example, coronary artery disease (CAD) arises from the buildup of atherosclerotic material in one or more coronary arteries and may result in a deprivation of blood, oxygen, and nutrients to the heart muscle.

SUMMARY

Some embodiments of rotational atherectomy and lithotripsy systems described herein remove (partially or completely) stenotic lesions in blood vessels by rotating one or more abrasive elements in an orbital path to abrade and breakdown the lesion, by emitting acoustic energy to fracture and breakdown the lesion, or a combination of both. The systems can operate in a manner that significantly increases vessel compliance around the treatment areas to thereby restore pulsatile blood flow and blood pressure to downstream vessels. Optionally, some versions of a rotational atherectomy and lithotripsy device described herein may include both rotational burrs and lithotripsy emitters arranged in various configurations that can be advanced together through the vasculature and operate concurrently or in sequence. In particular embodiments, the rotational burrs and lithotripsy emitters can be arranged along distal portion of the device and can be controlled (to operate concurrently or in sequence) from a user interface of a proximal control handle of the device.

Some embodiments described herein include a device for removing stenotic lesion material from an artery of a patient. The device can include an elongated flexible drive shaft defining a longitudinal axis and including a torque-transmitting coil of one or more filars; eccentric abrasive burrs fixedly mounted on a distal end portion of the torque-transmitting coil; and one or more lithotripsy emitters fixedly mounted on the distal end portion of the torque-transmitting coil, each of the lithotripsy emitters configured to selectively emit acoustic energy.

Some embodiments described herein include a device, wherein at least one of the lithotripsy emitters is mounted to the torque-transmitting coil between two of the eccentric abrasive burrs.

Some embodiments described herein include a device, wherein the eccentric abrasive burrs are coated with an abrasive media having a first grit.

Some embodiments described herein include a device, wherein the lithotripsy emitters are coated with the abrasive media having the first grit.

Some embodiments described herein include a device, wherein the lithotripsy emitters are coated with the abrasive media having a second grit.

Some embodiments described herein include a device, wherein the lithotripsy emitters have a nonabrasive exterior surface.

Some embodiments described herein include to a device, wherein each of the eccentric abrasive burrs has a center of mass offset from the longitudinal axis of elongated flexible drive shaft.

Some embodiments described herein include a device, wherein each of the lithotripsy emitters have a center of mass concentric with the longitudinal axis.

Some embodiments described herein include a device, wherein the one or more filars of the torque-transmitting coil include: a first filar electrically coupled to anodes of each of the lithotripsy emitters; a second filar electrically coupled to cathodes of the lithotripsy emitters.

Some embodiments described herein include a device, wherein the first filar is electrically insulated from the second filar.

Some embodiments described herein include a device, wherein the device further includes a pump for pumping conductive fluid into a balloon to inflate the balloon.

Some embodiments described herein include a device, wherein the conductive fluid includes saline and a contrast media.

Some embodiments described herein include a rotational atherectomy and lithotripsy device. The rotational atherectomy and lithotripsy device can include an elongated flexible drive shaft defining a longitudinal axis and including a torque-transmitting coil of one or more filars; one or more abrasive burrs fixedly mounted on a distal end portion of the torque-transmitting coil; and one or more lithotripsy emitters configured to selectively emit acoustic energy and positioned proximate to the one or more abrasive burrs such that all of the one or more abrasive burrs and the one or more lithotripsy emitters are longitudinally advanceable together with the elongated flexible drive shaft.

Some embodiments described herein include a rotational atherectomy and lithotripsy device, wherein the one or more lithotripsy emitters are fixedly mounted on the distal end portion of the torque-transmitting coil such that all of the one or more abrasive burrs and the one or more lithotripsy emitters are longitudinally advanceable together with the elongated flexible drive shaft.

Some embodiments described herein include a rotational atherectomy and lithotripsy device, further including a sheath that surrounds at least a portion of the elongated flexible drive shaft and that carries an expandable balloon at a distal end of the sheath encapsulating the one or more lithotripsy emitters.

Some embodiments described herein include a rotational atherectomy and lithotripsy device, wherein the sheath and the drive shaft are configured to advance together over a guidewire, and the one or more lithotripsy emitters are fixedly mounted on the sheath such that all of the one or more abrasive burrs and the one or more lithotripsy emitters are longitudinally advanceable together with the elongated flexible drive shaft.

Some embodiments described herein include a rotational atherectomy and lithotripsy device, wherein the device further includes a pump for pumping conductive fluid into the balloon to inflate the balloon.

Some embodiments described herein include a rotational atherectomy and lithotripsy device, wherein the conductive fluid includes saline and a contrast media.

Some embodiments described herein include a method of removing stenotic lesion material from an artery of a patient. The method can include advancing a torque-transmitting coil of a rotational atherectomy and lithotripsy device into an artery of the patient; rotating the torque-transmitting coil so that at least one abrasive burr mounted to the torque-transmitting coil abrades the stenotic lesion within the artery; and energizing at least one lithotripsy emitters mounted to the torque-transmitting coil applies acoustic energy to the stenotic lesion within the artery.

Some embodiments described herein include a device configured to apply both rotational atherectomy and lithotripsy. The device can include a control handle assembly; a torque-transmitting coil extending distally from the control handle assembly; one or more abrasive burrs fixedly mounted on a distal end portion of the torque-transmitting coil; and one or more lithotripsy emitters positioned proximate to the one or more abrasive burrs, wherein the control handle assembly is configured to activate rotation of the one or more abrasive burrs at a targeted arterial site and to activate the one or more lithotripsy emitters to output acoustic energy at the targeted arterial site.

Some embodiments described herein include a device configured to apply both rotational atherectomy and lithotripsy.

Some embodiments described herein include a method of using a device to apply both rotational atherectomy and lithotripsy.

Some of the embodiments described herein may provide one or more of the following advantages. First, some embodiments of the system can be configured to provide a contemporaneous output of rotational atherectomy and lithotripsy from a distal region of an individual device. As such, the rotational burrs and lithotripsy emitters can be simultaneously advanced (e.g., over a guidewire) through the vasculature toward a targeted site within an artery. At the targeted site, the combined rotational atherectomy and lithotripsy device may provide a clinician with beneficial options for applying rotational atherectomy, lithotripsy, or a combination of both, all of which can occur in some implementations without a need to withdraw one treatment device and then subsequently advance a different treatment device.

Second, some embodiments of the system provided herein can include an improved control handle that provides a convenient and efficient user interface for dual control of the rotational atherectomy burrs and the lithotripsy emitters. In particular examples, that the control handle can be a one-time-use, disposable unit that includes power and fluid connections for safe application of the rotational atherectomy treatment and the lithotripsy treatment and that houses both and electric motor (for driving rotation of the drive shaft) and a fluid pump (for delivery of saline or another fluid toward the distal end of the drive shaft). Optionally, the controller for the handle (which includes a processor and memory storing the control instructions) can be housed is a separate, screenless housing (e.g., with the power adapter unit that plugs into an ordinary wall socket). In such optional implementations, the controller does not require a user interface screen and instead the user interface buttons are provided along the control handle that is connected to the controller via a detachable cable. Accordingly, in these optional implementations, the controller can be reusable over time with multiple control handles (all of which are one-time-use, disposable unit), thereby advantageously conserving costs while preserving the convenient disposability of the driveshaft shaft and handle.

Third, some embodiments of the systems provided herein can include an improved rotational drive shaft that carries both one or more rotational atherectomy burrs and one or more lithotripsy emitters. As such, the rotational atherectomy burrs and lithotripsy emitters can be contemporaneously advanced over a guidewire and then rotated together during delivery of the rotational atherectomy treatment. In some circumstances, the lithotripsy emitters can be activated during the high-speed rotation of the drive shaft (which urges an orbital path for the rotational atherectomy burrs), thereby outputting the lithotripsy treatment while the lithotripsy emitters are urged outwardly against the targeted lesion.

Fourth, some embodiments of the systems provided herein can include an improved handle and sheath that facilitates retraction and extension of the abrasive elements to and from the sheath. Optionally, the sheath can be equipped with an expandable balloon and one or more lithotripsy emitters at its distal end. The retraction of the abrasive elements within the sheath advantageously covers the abrasive burrs while the rotational atherectomy device is navigated to within particular arteries or while the balloon of the sheath is inflated and the lithotripsy emitters output acoustic energy at the targeted site.

Fifth, some embodiments of the rotational atherectomy devices and systems provided herein can facilitate improved safety and ease of operation of the rotational atherectomy device. For example, the system can provide an added safety control that facilitates improved and intuitive operation for a user both during navigation of the drive shaft and during selective activation of rotational atherectomy treatment and lithotripsy treatment (after reaching the targeted site).

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 2A and 2B are longitudinal side views of example rotational atherectomy and lithotripsy devices for the systems of FIGS. 1A and 1B.

FIGS. 6A and 6B are longitudinal side views of an example rotational atherectomy and lithotripsy device for the systems of FIGS. 5A and 5B.

Like reference symbols in the various drawings indicate like elements.

DETAILED DESCRIPTION OF ILLUSTRATIVE EMBODIMENTS

Figure 1A:
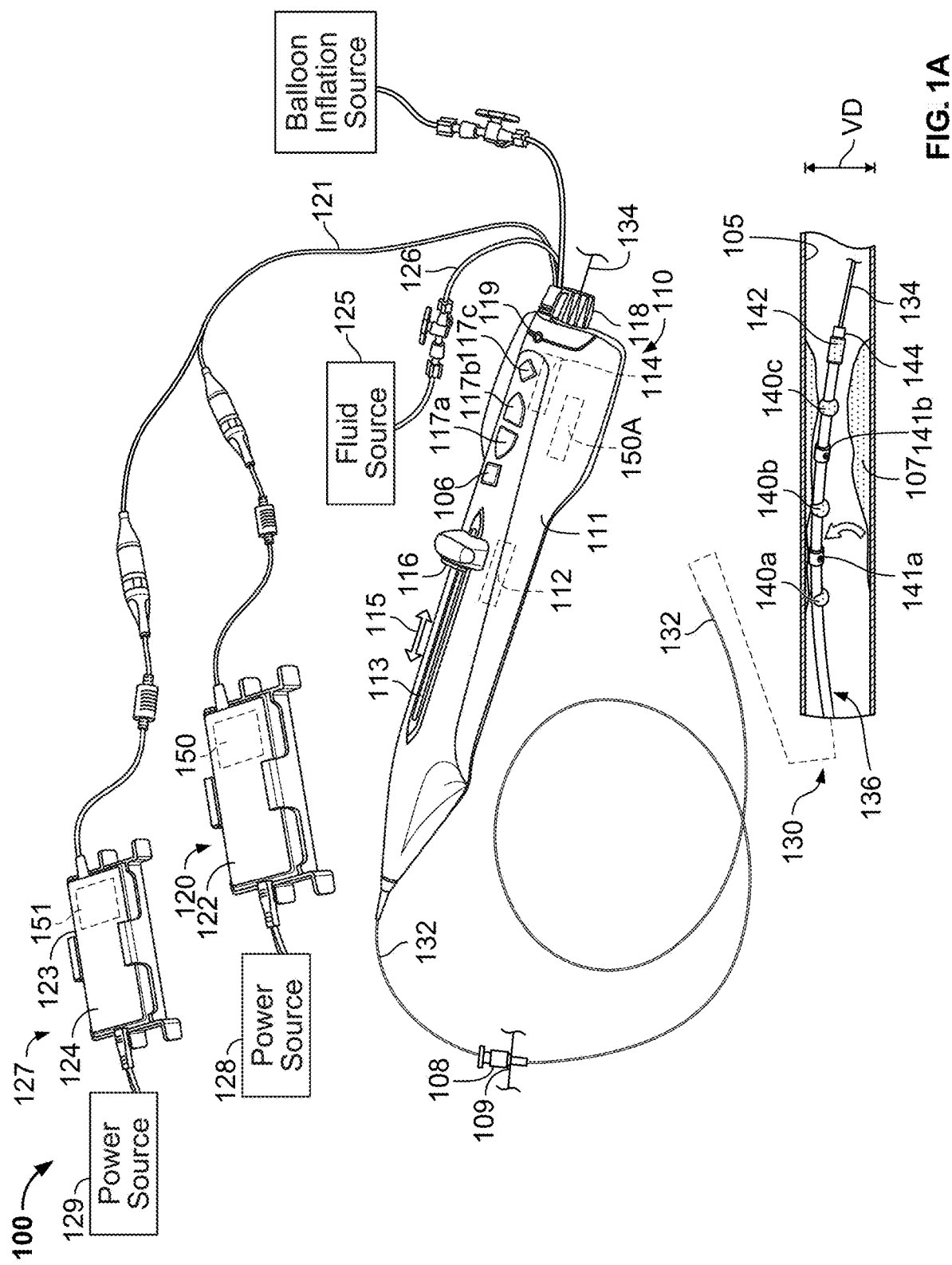
FIGS. 1A and 1B are perspective views of example rotational atherectomy and lithotripsy systems, in accordance with some embodiments.

Referring to FIG. 1A, some embodiments a rotational atherectomy and lithotripsy system 100 can be configured to provide a contemporaneous output of rotational atherectomy and lithotripsy for removing (partially or completely) a stenotic lesion 107 from a targeted blood vessel 105. The system 100 includes an actuator handle assembly 110 that controls movement of an elongated flexible drive shaft assembly 130. The drive shaft assembly 130 includes a flexible drive shaft 136, and a distal end portion of the driveshaft 136 includes one or more abrasive elements 140a-c configured to abrade the stenotic lesion 107 in the targeted vessel 105, and lithotripsy emitters 141a-b. As described in more detail below, the abrasive elements 140a-c can have a selected configuration and relative sizing along the distal end portion of the drive shaft 136 so as to improve navigation into targeted blood vessels that suffer from a significant buildup of calcified plaque or other stenotic material impairing vessel compliance of the artery wall (e.g., including peripheral arteries extending in the legs and feet, coronary arteries, and other arteries extending from the abdominal aorta, such as the common iliac artery, the external iliac artery, the internal iliac artery, the profunda artery, the gluteal artery, and the pudental artery). Furthermore, the selected configuration and relative sizing of the abrasive elements 140a-c can also achieve, when the drive shaft is rotated, an effective orbital path for abrading the stenotic material 107 in those vessels in preparation of application of lithotripsy by the lithotripsy emitters 141a-b. Thus, in some implementations, the system 100 can be configured to both remove the calcified plaque along the stenotic lesions 107 and increase the compliance of the treated vessel along with vessels upstream of the treated vessel. For example, the system 100 can remove stenotic lesions 107 within the common iliac artery and increase compliance of the common iliac artery and the abdominal aorta. In some embodiments, the removal of the stenotic lesions 107 facilitates increased vessel compliance where the vessel walls are relieved of restriction/reduced flexibility/calcification imposed upon the vessel walls by the stenotic lesions 107.

Still referring to FIG. 1A, the system 100 can also include one or more power sources 120 and 123, and a fluid source 125 (e.g., a saline container) connectable to the actuator handle assembly 110, and the actuator handle assembly 110 can house therein an electric motor 112 (configured to drive rotation of the driveshaft 136) and fluid pump 114 (configured to urge a fluid such as saline toward the distal end portion of the driveshaft 136). As described in more detail below, a controller 150 for activating the electric motor 112 and the pump 114 (responsive to inputs at the user interface buttons 116 and 117a-c of the handle assembly 110) can be contained inside a housing 122 of the power adapter 120 so that it is reusable with subsequent handle assemblies after the first handle assembly 110 is discarded (a single-use handle assembly). A controller 151 for activating the lithotripsy emitters 140a-b can be contained inside a housing 124 of the power adapter 123 so that it is reusable with subsequent handle assemblies after the first handle assembly 110 is discarded (a single-use handle assembly).

Alternatively, a controller 150A for operating the electric motor 112, the lithotripsy emitters 140a-b, and the pump 114 can be contained within the housing in the handle assembly 110 (in proximity to the electric motor 112 and the pump 114), and the entire handle assembly 110 can be discarded after a single use with a patient. In both options, the handle assembly 110 can be operated by a clinician using a simplified, screenless interface to perform and control the rotational atherectomy procedure (e.g., without a graphic display screen along the handle assembly or on a separate unit connected to the handle assembly).

Optionally, the elongated flexible drive shaft assembly 130 includes a sheath 132 that extends over a majority length of the flexible drive shaft 136 such that the abrasive elements 140a-c and the lithotripsy emitters 140a-b on the distal end portion of the drive shaft 136 are positioned distally of a distal-most end of the sheath 132. A proximal end of the sheath 132 is fixed to a distal end of the handle assembly 110. The flexible drive shaft 136 is slidably and rotatably disposed within a lumen of the sheath 132. The flexible drive shaft 136 defines a longitudinal lumen in which a guidewire 134 is slidably disposed. The guidewire 134 can extend through the handle assembly 110, the sheath 132, and the drive shaft 136 such that a proximal end of the guidewire 134 protrudes proximally from a rear port of a guidewire brake 118 at a proximal end of the handle assembly 110 while a distal end of the guidewire 134 extends distally of a distal-most end of the drive shaft 136. The flexible drive shaft 136 can include a torque-transmitting coil of one or more helically wound filars that defines the longitudinal lumen along a central longitudinal axis. In this embodiment, the torque-transmitting coil is formed from multiple helically wound filars, as described below in connection with FIGS. 3A and 3B. The drive shaft 136 is configured to rotate about the longitudinal axis while the sheath 132 remains generally stationary. Hence, during a rotational atherectomy procedure, the sheath 132 and the guidewire 134 are generally stationary while the flexible drive shaft 136 is controllably moved (e.g., rotating about the longitudinal axis and periodically longitudinally translating proximally and/or distally). In this embodiment, the flexible drive shaft 136 includes electrically-insulating and electrically-conducting elements to supply electrical power to the lithotripsy emitters 140a-b. For example, two of the filars can be sheathed in insulation material (e.g., a polyimide film) to provide an electrically isolated circuit that, when closed, provides electrical power to excite the lithotripsy emitters 140a-b to produce ultrasonic energy or a shockwave, as appropriate.

In the depicted embodiment, the exposed distal end portion of the driveshaft 136 includes one or more abrasive elements 140a-c, a (optional) distal stability element 142, and a (optional) concentric tip member 144. In the depicted embodiment, the one or more abrasive elements includes a set of five eccentric abrasive elements 140a-c that are fixedly mounted to an exterior of the torque-transmitting coil of the driveshaft 136 such that a center of mass for each abrasive element 140a-c is offset from a central longitudinal axis of the torque-transmitting coil. In this embodiment, the distal stability element 142 is concentrically-fixed to an exterior of the torque-transmitting coil of the driveshaft 136 between a distal-most one of the eccentric abrasive elements 140*a-c* and the concentric tip member 144. As such, the center of mass of the distal stability element 142 is aligned with the central axis of the drive shaft 136 while the center of mass of each abrasive element 140*a-c* is offset from the central axis of the drive shaft 136. The concentric tip member 144 is affixed to, and extends distally from, the terminal distal-most end of the torque-transmitting coil. As described in more detail below, the concentric tip member 144 can have a smoother surface than the abrasive surfaces of the distal stability element 142 and the eccentric abrasive elements 140*a-c*, and the concentric tip member 144 can be configured to provide initial penetration (and, optionally, dilation) through the stenotic lesion 107 in the targeted vessel 105. Optionally, the one or more abrasive elements 140*a-c* and drive shaft 136 can have a selected configuration and relative sizing (refer to FIGS. 2A-2B in one example) that advantageously provides advancement through a small percutaneous introducer 108 (e.g., sized to slidably receive instruments of 6-French diameter or smaller) at a percutaneous opening 109 along a patient's skin surface, and can further navigate through a stenotic lesion 107 in the targeted vessel 105, such as iliac artery described above, prior to sweeping a larger orbital path (during rotation of the driveshaft 136) for abrading the stenotic material 107.

In the depicted embodiment, the exposed distal end portion of the driveshaft 136 includes one or more lithotripsy emitters 141*a-b*. In the depicted embodiment, the one or more lithotripsy emitters include a set of two lithotripsy emitters 141*a-b* that fixedly mounted to an exterior of the torque-transmitting coil of the driveshaft 136 such that a center of mass for each lithotripsy emitter 141*a-b* is located on the central longitudinal axis of the torque-transmitting coil. In this embodiment, the resulting configuration includes a plurality of abrasive elements 140*a-c* that are offset from the central longitudinal axis of the torque-transmitting coil interspersed with a plurality of lithotripsy emitters 141*a-b* that are aligned with the central longitudinal axis of the torque-transmitting coil.

Still referring to FIG. 1A, as the drive shaft 136 is rotated about its longitudinal axis, the eccentric abrasive elements 140*a-c* (and the portion of the drive shaft 136 to which the one or more abrasive elements 140*a-c* are affixed) will be urged in an orbit path relative to the central axis of the drive shaft 136 (also as described below, for example, in connection with FIGS. 4 and 5). In general, faster speeds (rpm) of rotation of the drive shaft 136 will result in larger diameters of the orbit (within the limits of the vessel diameter). The orbiting one or more abrasive elements 140*a-c* will contact the stenotic lesion 107 to abrade the lesion to a reduced size with each traversal path through the lesion 107 (i.e., small particles of the lesion will be abraded from the lesion). Depending upon the rotation speed and the surrounding environment within the vessel 105, the rotating distal stability element 142 can remain generally closer to or at the longitudinal axis of the drive shaft 136 during the rotational atherectomy procedure. In some optional embodiments, two or more distal stability elements 142 are included. As described further below, contemporaneous with the rotation of the drive shaft 136, the drive shaft 136 can be translated back and forth (distally and proximally) along the longitudinal axis of the drive shaft 136. Hence, the stenotic lesion 107 can be abraded radially and longitudinally by virtue of the simultaneous translation and orbital rotation of the abrasive elements 140*a-c*.

Additionally, the torque-transmitting coil of the flexible drive shaft 136 is laterally flexible so that the drive shaft 136 can readily advance through a tortuous arterial path, and so that a portion of the drive shaft 136 at, and adjacent to, the one or more abrasive elements 140 can laterally deflect when acted on by the centrifugal forces resulting from the rotation of the one or more eccentric abrasive elements 140. In the depicted embodiment, the drive shaft 136 comprises one or more helically wound wires (or filars) that provides a uniform coil diameter than is less than the diameters of all of the abrasive elements 140*a-c* and the distal stability element 142. As described in more detail below, this relative sizing is referred to as the burr-to-coil diameter ratio, and the burr-to-coil diameter ratio can be about 1.2-1.7 for all abrasive burrs (elements 140*a-c* and distal stability element 142) along the torque-transmitting coil of the drive shaft. As such, the torque-transmitting coil of the flexible drive shaft 136 can achieve both sufficient lateral flexibility during navigation through a tortuous arterial path and sufficient longitudinal rigidity to be pushed through a stenotic lesion (while transmitting torque to rotate the abrasive elements 140*a-c*) in the targeted artery. In some embodiments, the one or more helically wound wires (filars) of the torque-transmitting coil of the flexible drive shaft 136 comprise a metallic material such as, but not limited to, stainless steel (e.g., 316, 316L, or 316LVM), nitinol, titanium, titanium alloys (e.g., titanium beta 3), carbon steel, or another suitable metal or metal alloy. Any suitable number of individual filars can be included to construct the drive shaft 136. For example, in some embodiments one, two, three, four, five, six, seven, eight, nine, ten, eleven, twelve, thirteen, fourteen, fifteen, or more than fifteen individual filars can be helically wound among each other to make up the drive shaft 136. As described further below, the direction in which the filars of the drive shaft 136 are wound is a design feature that can be selected to obtain desirable, advantageous operational characteristics. For example, the drive shaft 136 can be formed using one or more filars that are wound about the shaft's central axis in a wind direction that is opposite from the rotational direction of the drive shaft 136 urged by the handle assembly 110, which can provide a number of benefits and improved safety during use of the drive shaft 136 with the guidewire 134 in severely constricted arteries or arteries having a tortuous path such as those extending from the abdominal aorta (e.g., the common iliac artery, the external iliac artery, the internal iliac artery, the profunda artery, the gluteal artery, and the pudendal artery).

After, during, or before the rotational atherectomy described above, the lithotripsy emitters 141*a-b* can be energized to generate and emit acoustic energy (e.g., sound waves, sonic waves, ultrasonic waves, or shockwaves). The acoustic energy can be delivered to the stenotic lesion 107 to deteriorate, crack, and thereby fractures the stenotic lesion 107. The lithotripsy emitters 141*a-b* can be formed of one or more material capable of transmitting the acoustic energy, including but not limited to metal, metal alloys, shape memory alloys, polymers, ceramics, fibers, crystals or composites thereof.

The lithotripsy emitters can be engaged to emit the acoustic energy while the drive shaft 136 is being rotated or while the drive shaft 136 is not being rotated. For example, to apply rotational atherectomy concurrently, the drive shaft 136 can be rotated while the lithotripsy emitters 141*a-b* are engaged. For example, to apply lithotripsy without rotational atherectomy, the drive shaft 136 can be held stationary while the lithotripsy emitters 141*a-b* are engaged. Similarly, the drive shaft 136 can be rotated to apply rotational atherectomy while the lithotripsy emitters 141*a-b* are not engaged. As such, the rotational atherectomy and lithotripsy may be supplied concurrently or in sequence.

Still referring to FIG. 1A, the torque-transmitting coil of the drive shaft 136 in this embodiment defines a hollow central core (e.g., referred to as a central lumen of the drive shaft 136), which can slidably receive the guidewire 134 therein. In some embodiments, the lumen can be used to aspirate particulate or to convey fluids that are beneficial for the atherectomy procedure. In use, the guidewire 134 is advanced to the targeted vessel 105, and then the drive shaft 136 is advanced over the guidewire 134 in order to reach the targeted vessel 105. The guidewire 134 has a length sufficient to extend through the entire drive shaft 136 and the entire handle assembly 110. As such, a proximal end of the guidewire 134 protrudes proximally from the rear port of the guidewire brake 118 at a proximal end of the handle assembly 110 while a distal end of the guidewire 134 extends distally of a distal-most end of the drive shaft 136.

In the depicted embodiment, the concentric tip member 144 is welded or otherwise fixed to a distal-most end of the torque-transmitting coil of the drive shaft 136 (e.g., axially distal of the coil), and the distal stability element 142 is welded or otherwise fixed to the distal-most end of the torque-transmitting coil of the drive shaft 136 (e.g., radially outward of the coil). As described in more detail below, the smooth initial surface of the concentric tip member 144 followed by the abrasive surface on the distal stability element 142 can help facilitate the initial expansion and abrasion of a pilot path through the stenotic lesion 107 in the targeted vessel 105.

Still referring to FIG. 1A, the one or more abrasive elements 140*a-c* (each of which may also be referred to as an abrasive burr) can comprise a biocompatible material that is coated with an abrasive media such as diamond grit, diamond particles, silicon carbide, and the like. In the depicted embodiment, the abrasive elements 140*a-c* include a total of three discrete abrasive spheres/cylinders that are spaced apart from each other (and spaced relative to the distal stability element 142) to facilitate both navigation to, and orbital abrading within, a targeted artery, including those where the vessel interior diameter is constricted (severely or fully) and the access path follows a tortuous route. In the depicted embodiment, the abrasive elements 140*a* and 140*c* have smaller diameters than abrasive elements 140*b*. In some embodiments, abrasive elements 140*a* and 140*c* can have a same diameter as each other. In some embodiments, all three of abrasive elements 140*a-c* are spheres are mounted in an eccentric spiral arrangement (described below in connection with FIGS. 2A-2B). As with the distal stability element 142, the abrasive burrs 140*a-c* may be mounted to the exterior of the torque-transmitting coil of the drive shaft 136 using a biocompatible adhesive, high temperature solder, welding, press fitting, and the like. Alternatively, the one or more abrasive elements 140*a-c* can be integrally formed as a unitary structure with the filars of the drive shaft 136 (e.g., using filars that are wound in a different pattern to create an axially offset structure, or the like).

Still referring to FIG. 1A, the rotational atherectomy system 100 also includes the actuator handle assembly 110. The actuator handle assembly 110 includes a housing 111 and an internal carriage assembly (not shown) that translates along an actuator slot 113. For example, a user can grasp the actuator 116 to urge movement along the actuator slot 113, which causes the internal carriage assembly to slidably translate along the longitudinal axis of the handle assembly 110, as indicated by the arrow 115. In some embodiments the carriage assembly can be translated, without limitation, about 8 cm to about 12 cm, or about 6 cm to about 10 cm, or about 4 cm to about 8 cm, or about 6 cm to about 14 cm. As the carriage assembly is translated in relation to the housing 111, the drive shaft 136 translates in relation to the sheath 132 in a corresponding manner. As such, the user can reciprocate the distal end portion of the drive shaft 136 in distal and proximal directions relative to the stenotic lesion 107 within the targeted vessel 105.

The handle assembly 110 has a cable connection 121 with a power adapter 120 and power adapter 123 (each configured to receive electrical power from power source 128 and power source 129 such as a wall plug) and fluid line connection 126 with a saline source 125. The cable 121 can communicate both power and data (e.g., when the controller 150 is housed within the power adapter housing 122), or alternatively, can communicate electrical power (e.g., when implementing the version with the controller 150A that is housed in the handle housing 111). The cable 121 includes one or more removable connection jacks so that the handle assembly 110 can be readily discarded after a single use and the power adapters 120 and 123 can be reused with subsequent handle assemblies. The fluid line connection 126 can include a luer fitting and a flow on-off valve so that a user can removably connect the handle assembly to a pole-mounted saline bag or other fluid source 125 without the need for an external pump mechanism positioned exterior to the handle housing 111.

Still referring to FIG. 1A, the actuator 116 of the handle assembly 110 includes a rotational power button that activates the electrical motor 112 (carried by the internal carriage assembly) to drive the rotation of the drive shaft 136. For example, when the rotational power button of the actuator 116 is depressed, power is supplied to the electric motor 112, which is coupled to the drive shaft 136 via a set of gears. It should be understood that the rotational atherectomy system 100 is configured to rotate the drive shaft 136 at a high speed of rotation (e.g., 20,000-160,000 rpm) such that the eccentric one or more abrasive elements 140*a-c* revolve in an orbital path to thereby contact and remove portions of a target lesion 107 (even those portions of the lesion that are spaced farther from the axis of the drive shaft 136 than the maximum radius of the abrasive elements 140*a-c*).

To operate the handle assembly 110 during a rotational atherectomy procedure, a clinician can grasp the actuator 116 and depress rotational power button (on the actuator 116) with the same hand. The clinician can move (translate) the actuator 116 along the slot 113 distally and proximally by hand (e.g., back and forth in relation to the housing 111), while maintaining the rotational power button of the actuator 116 in the depressed state. In that manner, a target lesion 107 can be abraded radially and longitudinally by virtue of the resulting orbital rotation and translation of the abrasive elements 140*a-c*.

To further operate the handle assembly 110 during a rotational atherectomy procedure, a clinician can select a rotational speed using electrical switches 117*a* and 117*b*. In some cases, the rotational speed can be selected through a set of predefined speeds (e.g., at least two predefined speed settings, such as "low" and "high") with electrical switch 117*a* causing an increase in the speed setting and electrical switch 117*b* causing a decrease in the speed setting. Optionally, each of the electrical switches 117*a-b* can also include a light indicator. For example, when the electrical switches 117a-b allow for selection for a "high" and "low" speed, respectively, the electrical switches 117a-b can each have a single light, such that when a speed is selected, the light corresponding to the selected electrical switch 117a or 117b is illuminated to inform a clinician of the selected speed. In some embodiments, the light can shine through electrical switches 117 and 117b. Alternatively, a light can be positioned proximal electrical switch 117a-b. As another example, when the electrical switches 117a-b allow modification of a speed between a range of speeds, the light indicator can be a light bar, such that a number of lights illuminated on the light bar correspond to a selected speed.

Still referring to FIG. 1A, handle assembly 110 can include a fluid pump switch 117c, which can activate the internal fluid pump 114 to draw fluid (e.g., saline in this embodiment) from the fluid line 126 and urge the fluid through the sheath 132 toward the distal end portion of the drive shaft 136. As such, the fluid pump switch 117c can be used to both initially prime the sheath 132 (and remove air before insertion into the patient) and then selectively activate additional flush fluid through the sheath 132 and into the vessel 105. In some cases, a first depression of the fluid pump switch 117c will turn the internal pump 114 on, while a second depression will turn the pump 114 off. In some embodiments, the fluid pump switch 117c includes a light indicator, such that when the pump is on, a light is illuminated to inform the clinician that the pump is on.

To operate the handle assembly 110 during a lithotripsy procedure, the clinician can engage the lithotripsy emitters 141a-b using an electrical switch 106. In some cases, the electrical switch 106 is a momentary switch, such that the switch closes a circuit to energize the lithotripsy emitters 141a-b when, and only when, the electrical switch 106 is pressed. In some cases, the electrical switch 106 is a latching switch, such that the switch closes the circuit to energize the lithotripsy emitters 141a-b when the clinician initially presses the electrical switch 106 and remains closed until a second press of the electrical switch 106. As shown the various elements of the handle 110 can be used concurrently. For example, the actuator 116 can be manipulated by the clinician with one hand, while their other hand can manipulate the electrical switches 106 and 117a-c, etc.

In the depicted embodiment, the handle assembly 110 also includes a guidewire brake 118 that can be selectively actuated (e.g., pivoted relative to the handle housing 111 in this embodiment) to releasably clamp the guidewire 134 in a stationary position relative to the handle assembly 110 (and, in turn, stationary in relation to rotations of the drive shaft 136 during an atherectomy treatment). While the drive shaft 136 and handle assembly 110 are being advanced over the guidewire 134 to put the one or more abrasive elements 140 into a targeted position within a patient's vessel, the guidewire brake 118 is in a non-activated state (e.g., pivoted counter-clockwise about the central guidewire axis) from a rear perspective) so that the handle assembly 110 is free to slide in relation to the guidewire 134. Then, when the clinician is ready to begin the atherectomy treatment, the guidewire brake 118 can be activated (e.g., pivoted clockwise about the central guidewire axis) to mechanically engaged an exterior of the guidewire 134 and thereby releasably detain/lock the guidewire 134 in relation to the handle assembly 110. That way the guidewire 134 will not rotate while the drive shaft 136 is rotating, and the guidewire 134 will not translate while the actuator 116 is being manually translated in the direction 115.

Still referring to FIG. 1A, handle assembly 110 can include a guidewire brake light 119 that positioned along an upper face of the handle housing 111 at a position proximal to the other user interface buttons 117a-c and adjacent to the guidewire brake 118. As such, a user can readily view the guidewire brake light 119 and receive confirmation of whether the guidewire brake 118 is fully activated (to clamp the guidewire 134) before selecting the rotational speed (e.g., buttons 117a-b) and activating rotation (e.g., button on the actuator 116). As such, the screenless user interface of the handle assembly 110 can provide a simplified and fluid hand motion for the user while also communicating effective information to the user. Optionally, the controller 150 (or 150A in other embodiments) can be configured to prevent the electric motor 112 from driving rotation of the drive shaft 136 until: (1) the guidewire brake 118 is activated (e.g., with the guidewire brake light 119 illuminated), (2) the pump 114 is activated to drive the flush fluid (e.g., via actuation of fluid pump switch 117c that then illuminates the button 117c), (3) a rotation speed has been selected via speed selection switches 117a and 117b (e.g., with a speed indicator light thereon being activated), or a combination of all these conditions. As another example, the indicator lights associated with the selection switches 117a and 117b, the fluid pump switch 117c, and the guidewire brake light 119 will alert a clinician that the rotational atherectomy system 100 should not be operated until all three systems (the motor, the pump, the guidewire brake) are activated. For example, each system may have a green light, such that three green lights indicates the clinician can proceed with the atherectomy procedure. Optionally, only the guidewire 118 needs to be actuated to allow rotation of the rotational atherectomy system 100.

Still referring to FIG. 1A, the rotational atherectomy system 100 also includes the controller 150 and the controller 151, which in this embodiment each includes a processor and computer-readable memory storing control instructions thereon. The controllers 150 can be configured to receive input from sensors housed within the handle assembly, to receive input from the user interface on the handle assembly 110 (e.g., switches/actuators 116, 117a-c, and 118), and to control the activation of the electric motor 112 and the pump 114 (responsive to inputs at the user interface switches/actuators). The controller 151 can be configured to receive input from sensors housed within the handle assembly, to receive input from the user interface on the handle assembly 110 (e.g., switch 106), and to control activation of the lithotripsy emitters 141a-b. In this embodiment, the lithotripsy emitters 141a-b require different (e.g., higher) electrical power than the other elements of the system 100, and therefore a different power source 129 and controller 151 is used for the lithotripsy emitters 141a-b compared to other elements of the system. However, in some alternatives, a single power source 128 and controller 150 can be used for both the lithotripsy emitters 141a-b and the other elements of the system, allowing those alternative systems to use, for example, a single power source 128 and a single controller 150.

In this embodiment, the controllers 150 and 151 are contained inside the housings 122 and 123 of the power adapters 120 and 127 so that they is reusable with subsequent handle assemblies after the first handle assembly 110 is discarded (e.g., after use with a first patient). As previously described, the cable 121 can provide data communication between the controllers 150 and 151 and the components of the user interface (e.g., switches/actuators 106, 116, 117a-c, and 118), the electric motor 112, the pump 114, and the feedback sensors housed within the handle assembly 110. In an alternative embodiment, the controller (including the processor and computer-readable memory storing the control instructions) can be provided in the form of controller 150A configured to be contained within the housing 111 of the handle assembly 110 (in proximity to the electric motor 112 and the pump 114). In both options, the handle assembly 110 can be operated by a clinician using the above-described simplified, screenless interface to perform and control the rotational atherectomy procedure (e.g., without a user interface display screen along the handle assembly or on the units connected to the handle assembly). Preferably, the controllers 150 and 151 (or controller 150A) is housed in a manner that is sealed from fluids encountered by the handle assembly, such as saline, blood, or others.

Figure 1B:
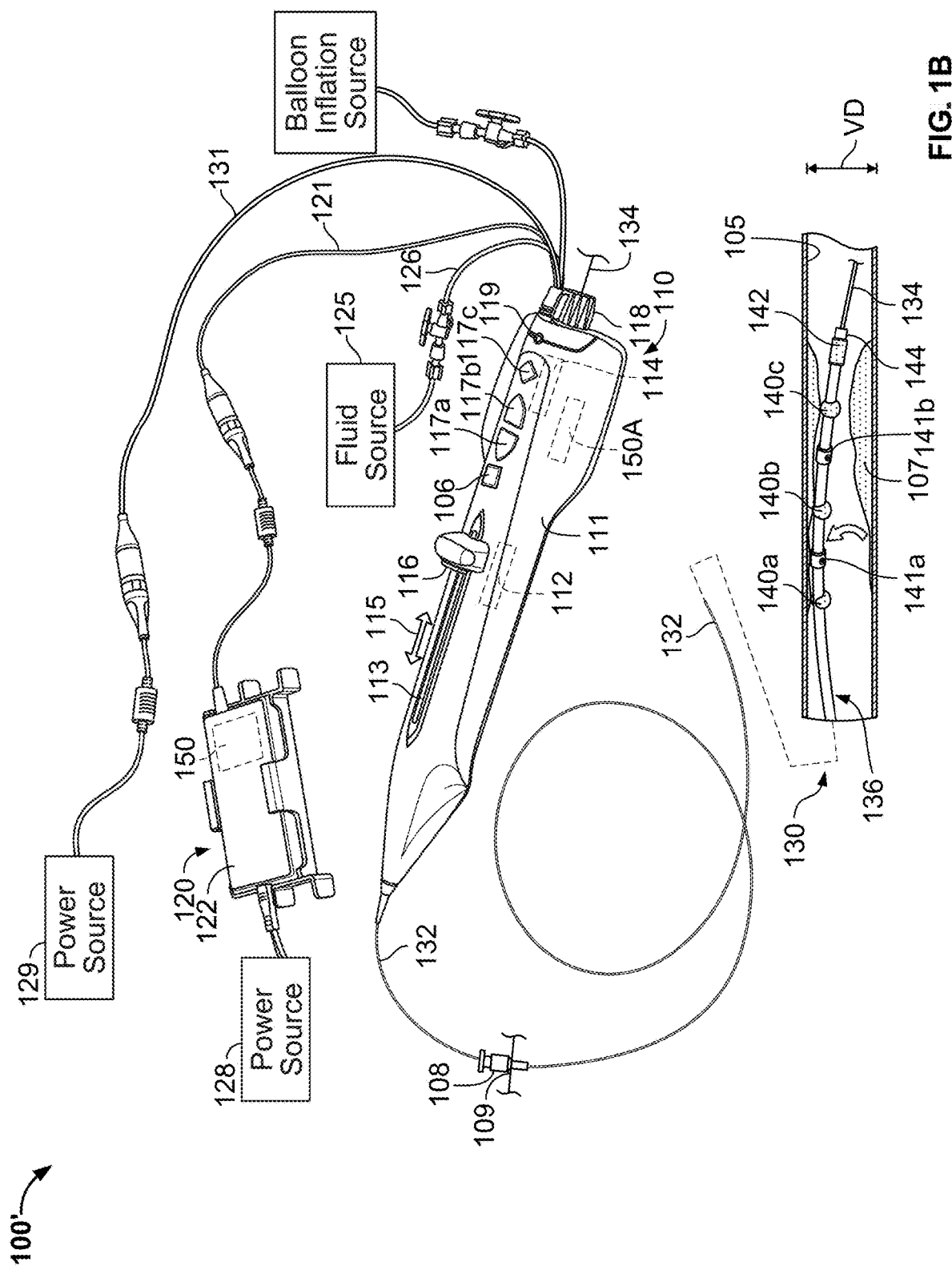

Referring now to FIG. 1B, some embodiments of a rotational atherectomy and lithotripsy system 100' include a single controller. In this embodiment, a controller 150 for operating the electric motor 112, the lithotripsy emitters 140a-b, and the pump 114 can be contained within the housing 122, connected by the cable connection 121 to the handle 110. In this embodiment, the power source 129 is kept electrically isolated from the controller 150, and used to energize the lithotripsy emitters 140a-b. The handle assembly 110 has a cable connection 131 with the power source 129. The cable 131 includes one or more removable connection jacks so that the handle assembly 110 can be readily discarded after a single use and the power source 129 can be reused with subsequent handle assemblies.

Referring now to FIGS. 2A and 2B, some embodiments of the distal end portion of the drive shaft 136 of the systems 100 and 100' include an improved configuration of the abrasive burrs and lithotripsy emitters (and optionally the distal stability element) that provide a relative orientation, relative spacing, and relative sizing along the torque-transmitting coil of the drive shaft 136 so as to achieve an efficient access path to such arteries distal to the common iliac artery, including those where the vessel interior diameter is constricted (severely or fully) and the access path follows a tortuous route.

Referring now to FIG. 2A, the abrasive elements 200a-c are eccentrically-fixed to the torque-transmitting coil 137 of the driveshaft 136. The abrasive elements 200a-c are arranged at differing radial angles in relation to the drive shaft 136 as depicted here. In such a case, a path defined by the centers of mass of the abrasive elements 200a-c spirals along the drive shaft 136 around the central longitudinal axis of the drive shaft 136. In some cases (e.g., when the diameters of the abrasive elements 200a-c are equal and the adjacent abrasive elements are all equally spaced), the centers of mass of the abrasive elements 200a-c define a helical path along/around the drive shaft 136. The arrangements of the abrasive elements 200a-c around the drive shaft 136 can facilitate orbital rotation of the abrasive elements 200a-c.

In the depicted embodiment, the two outermost abrasive elements (e.g., abrasive elements 200a, 200c) are smaller in maximum diameter than the inner abrasive element (e.g., abrasive elements 200b). Optionally, in some embodiments, all of the abrasive elements can be the same size. In particular embodiments, three or more different sizes of abrasive elements are included. Any and all such possible arrangements of sizes of abrasive elements are envisioned and within the scope of this disclosure.

The abrasive elements 200a-c can be made to any suitable size. For clarity, the size of the abrasive elements 200a-c will refer herein to the maximum outer diameter of individual abrasive elements of the abrasive elements 200a-c. In some embodiments, the abrasive elements 200a-c are about 2 mm in size (maximum outer diameter). In some embodiments, the size of the abrasive elements 200a-c is in a range of about 1.5 mm to about 2.5 mm, or about 1.0 mm to about 3.0 mm, or about 0.5 mm to about 4.0 mm, without limitation. Again, in a single embodiment, one or more of the abrasive elements 200a-c can have a different size in comparison to the other abrasive elements 200a-c. In some embodiments, the two outermost abrasive elements are about 1.5 mm in diameter and the inner abrasive elements are about 2.0 mm in diameter.

Referring still to FIG. 2A, the lithotripsy emitters 202a-b are concentrically-fixed to the torque-transmitting coil 137 of the driveshaft 136. As such, a path defined by the centers of mass of the abrasive elements 200a-c spirals along a path defined by the centers of mass of the lithotripsy emitters 202a-b. In some cases, (e.g., when the diameters of the abrasive elements 200a-c are equal and the adjacent abrasive elements are all equally spaced), the centers of mass of the abrasive elements 200a-c define a helical path spirals along a path defined by the centers of mass of the lithotripsy emitters 202a-b.

In the depicted embodiment, the lithotripsy emitters 202a-b are all of a the same size. The lithotripsy emitters 202a-b may be cylindrical in shape, having a diameter that is the same, smaller than, or larger than maximum diameters of one or more of the abrasive elements 200a-c. For example, in an instance in which the two outermost abrasive elements (e.g., abrasive elements 200a, 200c) are smaller in maximum diameter than the inner abrasive element (e.g., abrasive elements 200b), the lithotripsy emitters 202a-b may have a diameter that is the same as the maximum diameter of the outermost abrasive elements (e.g., abrasive elements 200a, 200c). However, other relationships are possible.

Referring still to FIG. 2A, the abrasive elements 200a-c can include an outer surface made of one or more biocompatible material that is coated with an abrasive media such as diamond grit, diamond particles, silicon carbide, and the like. Meanwhile, the lithotripsy emitters 200a-b can include an outer surface made of the same or different biocompatible material without added abrasive media. In such a configuration, the abrasive elements 200a-c can provide rotational atherectomy while the lithotripsy emitters 202a-b can provide lithotripsy.

Referring now to FIG. 2B, the lithotripsy emitters 204a-b can include an outer surface made of one or more biocompatible material that is coated with an abrasive media such as diamond grit, diamond particles, silicon carbide, and the like. In some implementations, the abrasive media on the rotational elements 200a-c is the same abrasive media as on the lithotripsy emitters 204a-b. In some implementations, a second abrasive media on the rotational elements 200a-c is different than a first abrasive media on the lithotripsy emitters 204a-b. For example, the second abrasive media may be diamond grit, diamond particles, silicon carbide, and the like.

In some implementations, the abrasive media of the rotational elements 202a-c may have the same grit size as abrasive media of the lithotripsy emitters 204a-b. In some implementations, the abrasive media of the rotational elements 202a-c may have a larger or smaller grit size compared to abrasive media of the lithotripsy emitters 204a-b.

Figure 3A:
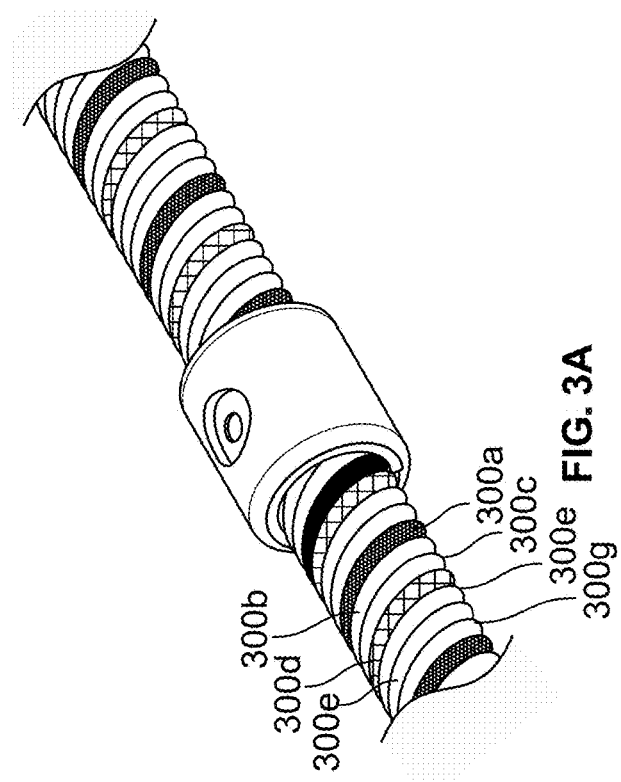
FIGS. 3A and 3B are a perspective view and a cross-sectional side view of filars of a rotational atherectomy and lithotripsy device for the systems of FIGS. 1A and 1.
Figure 3B:
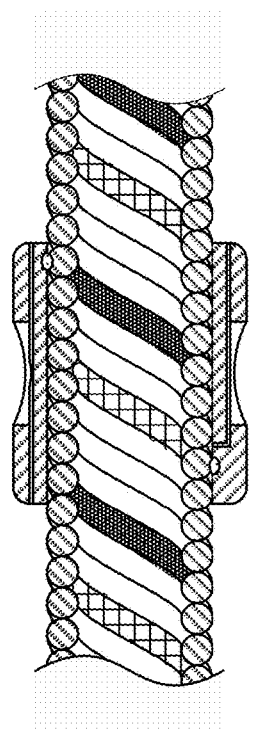

Referring now to FIGS. 3A and 3B, the torque transmitting coil 137 has a plurality of filars 300a-g. Some of these filars, filar 300a and 300d in this example, can electrically insulated and used to supply electrical power to lithotripsy emitter 141. For example, the filar 300a and the filar 300d can be separately sheathed in an electrically-insulating material to be electrically isolated from each other and from the other filars 300b-c and 300e-g.

The lithotripsy emitter 141 can include an anode 302 and a cathode 304. The insulated filar 300a can be electrically coupled (e.g., spot welded) to the anode 302, and the insulated filar 300d can be electrically coupled to the cathode 304. The electrical switch 106 can complete a circuit with the power source 129, providing electrical energy through the circuit and to the lithotripsy emitter 140, causing the lithotripsy emitter 141 to emit acoustic energy (e.g., into the stenotic lesion 107).

The other filars 300b-c and 300e-g may be insulated or uninsulated. For example, the filars 300b-c and 300e-g may be insulated to reduce the risk of electrical arcing between energized filars 300-a or 300d and other filars. For example, the filars 300b-c and 300e-g may be uninsulated to reduce the size of the transmitting coil 137 compared to a version with insulated filars.

Figure 4:
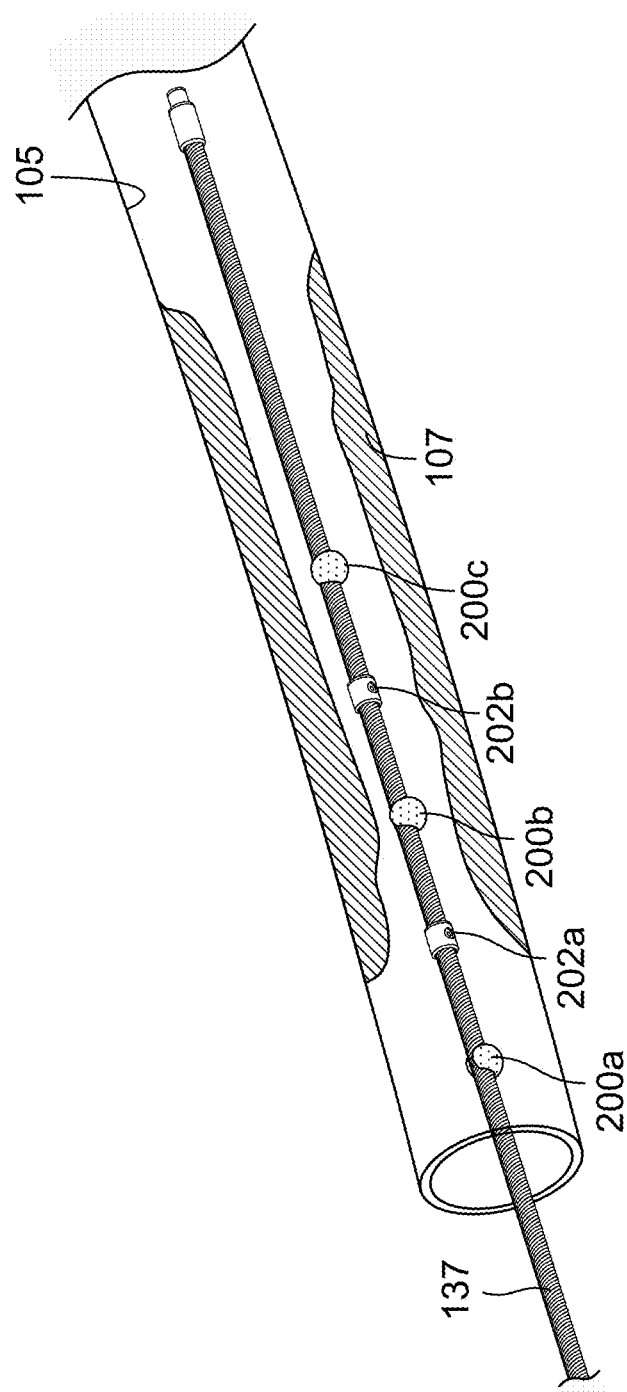
FIG. 4 is a perspective view of an example rotational atherectomy and lithotripsy device for the systems of FIGS. 1A and 1B.

Referring now to FIG. 4, the distal end portion of the drive shaft 136 is shown positioned in a stenotic lesion 107 of the blood vessel 105. While so positioned, the stenotic lesion 107 can be broken down or reduced. For example, torque transmitted by the coil 137 causes the rotational elements 202a-c to rotate and abrade the stenotic lesion 107. Concurrently and/or separately, the lithotripsy emitters 202a-b can be actuated to emit acoustic energy into the stenotic lesion 107.

Figure 5A:
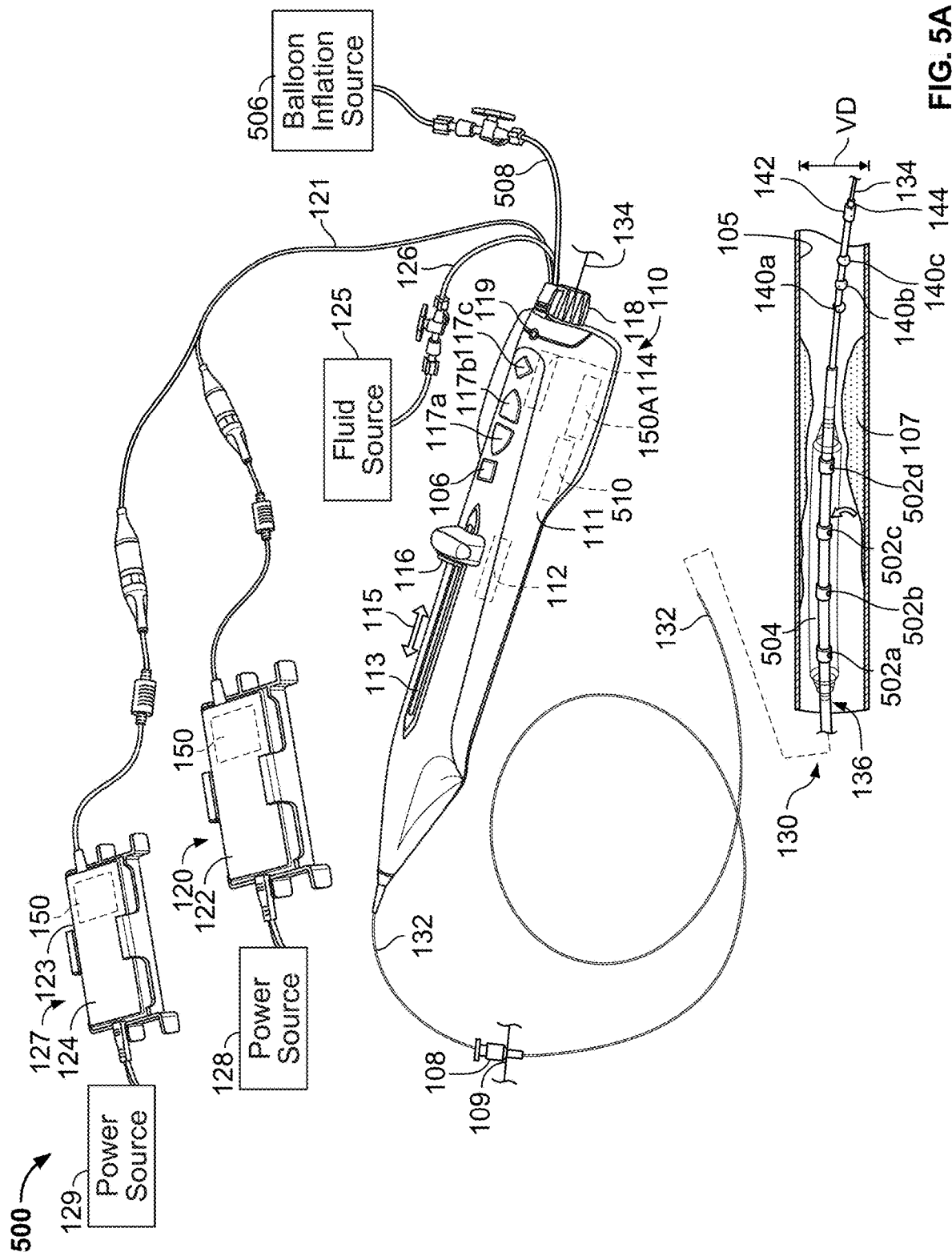
FIGS. 5A and 5B are perspective views of example rotational atherectomy and lithotripsy systems, in accordance with some embodiments.
Figure 5B:
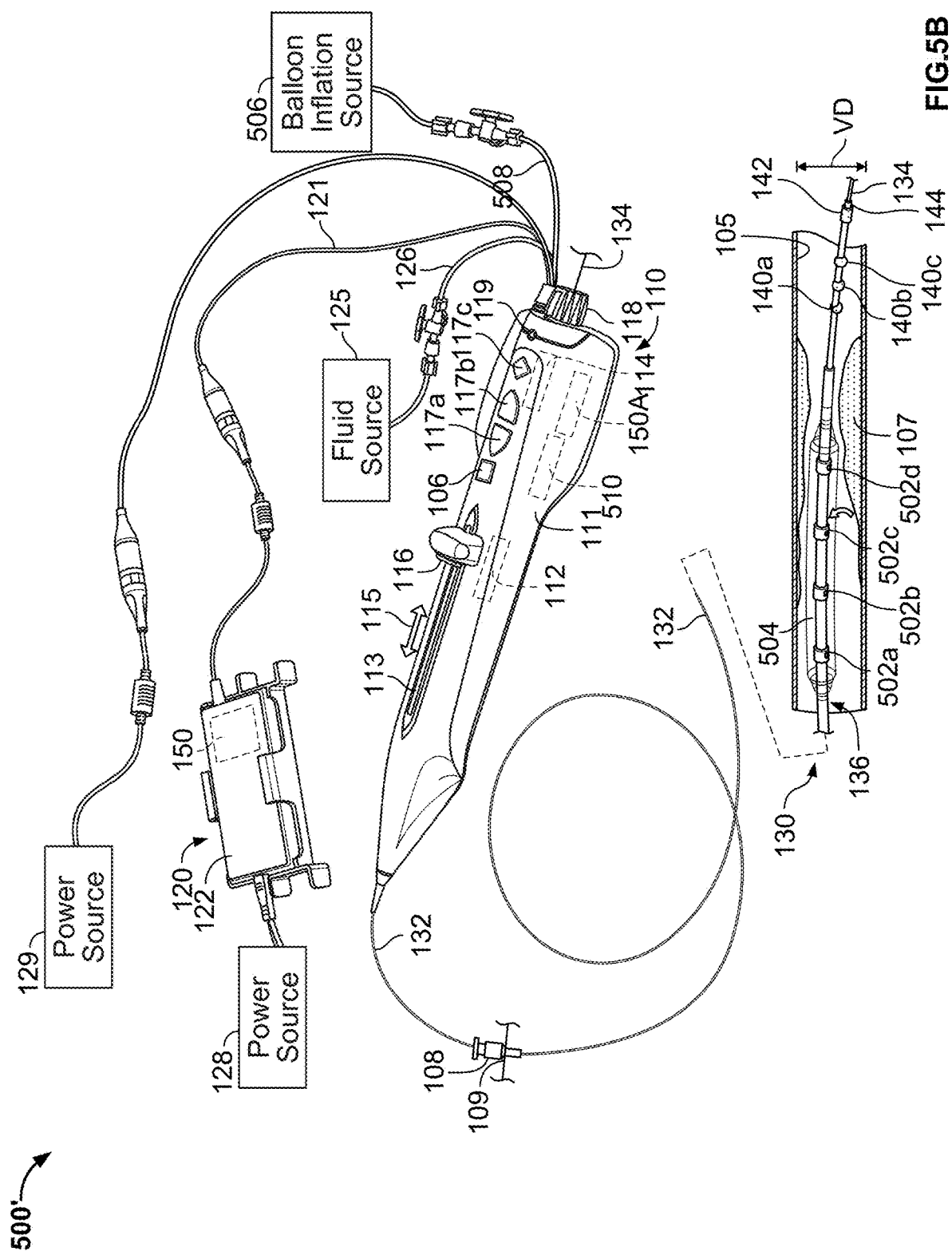

Referring now to FIGS. 5A and 5B, in some embodiments a rotational atherectomy and lithotripsy systems 500 and 500' for removing (partially or completely) a stenotic lesion 107 from a targeted blood vessel 105 can include an actuator handle assembly 110 that controls movement of an elongated flexible drive shaft assembly 130. The rotational atherectomy and lithotripsy system 500 includes rotational elements 140a-d and lithotripsy emitters 502a-c positioned in an inflatable balloon 504. The inflatable balloon 504 may be formed from any desired material, for instance, a low-profile flexible or semi-compliant polymeric material such as Pebax or polyurethane. For example, the material may be selected such that, when inflated, the material is capable of conforming to the expected shapes of stenotic lesions.

Unlike the system 100, in which the distal end portion of the driveshaft 136 has rotational elements 140 interspersed with the lithotripsy emitters 141, the system 500's distal end portion of the driveshaft 136 has a first portion containing the rotational elements 140a-c, and a second portion containing the lithotripsy emitters 502 and the balloon 504. In the example shown, the first portion (with the rotational elements 140a-c) is more distal than the second portion (with the lithotripsy emitters 502 an the 504). In some examples (not shown), the second portion is more distal than the first portion.

To inflate or deflate the balloon 504, a balloon inflation source 506 contains a conductive fluid that can be pumped into and out of the balloon 504. For example, the conductive fluid can be a fluid capable of effective transmission of acoustic energy from the lithotripsy emitters 141 to the stenotic lesion 107. The conductive fluid can include saline (e.g., in an isotonic or other concentration). In addition, the conductive fluid can include one or more contrast media to permit fluoroscopic viewing or other medical imaging during use.

A fluid line 508 can include a luer fitting and a flow on-off valve so that a user can removably connect the handle assembly to a pole-mounted bag containing the balloon inflation source 506. A balloon-pump 510 (responsive to inputs at the user electrical switch 106) ca be contained actuator handle assembly 110 and, when engaged, urge the conductive fluid into or out of the balloon 504 and balloon inflation source 506.

For example, upon user actuation of the electrical switch 106, the balloon pump 510 can fill the balloon 504 from the balloon inflation source 506 and the controller 151 can engage the lithotripsy emitters 502. When the user actuation of the electrical switch 106 ends, the balloon pump 510 can deflate the balloon 504, returning the conductive fluid back to the balloon inflation source 506, and the controller 151 can disengage the lithotripsy emitters 502. In another example, not shown, an inflation switch can be engaged only to inflate and deflate the balloon 504, while the electrical switch 106 is only used to engage the lithotripsy emitters 502.

Referring now to FIGS. 6A and 6B, some embodiments of the distal end portion of the drive shaft 136 of the systems 500 and 500' include an improved configuration of the abrasive burrs lithotripsy emitters, and balloon (and optionally the distal stability element) that provide a relative orientation, relative spacing, and relative sizing along the torque-transmitting coil of the drive shaft 136 so as to achieve an efficient access path to such arteries distal to the common iliac artery, including those where the vessel interior diameter is constricted (severely or fully) and the access path follows a tortuous route.

The lithotripsy emitters 502a-d are shown encapsulated by the balloon 504, which is shown in a deflated state with respect to FIG. 6A and in an inflated state in FIG. 6B. The rotational elements 140a-c are shown distal of the balloon 504 on the drive shaft in this example, though on other examples some or all of the rotational elements 140a-c may be positioned proximal to the balloon 504.

The balloon 504 can form a sealed chamber 506 with the drive shaft 137 such that the conductive fluid does not egress the balloon 504, and such that any fluid surrounding the balloon 504 does not ingress into the sealed chamber 506. For example, the balloon 504 can be sealed with a laser bond, heat seal, an adhesive, or some other appropriate form of attachment.

Figure 7A:
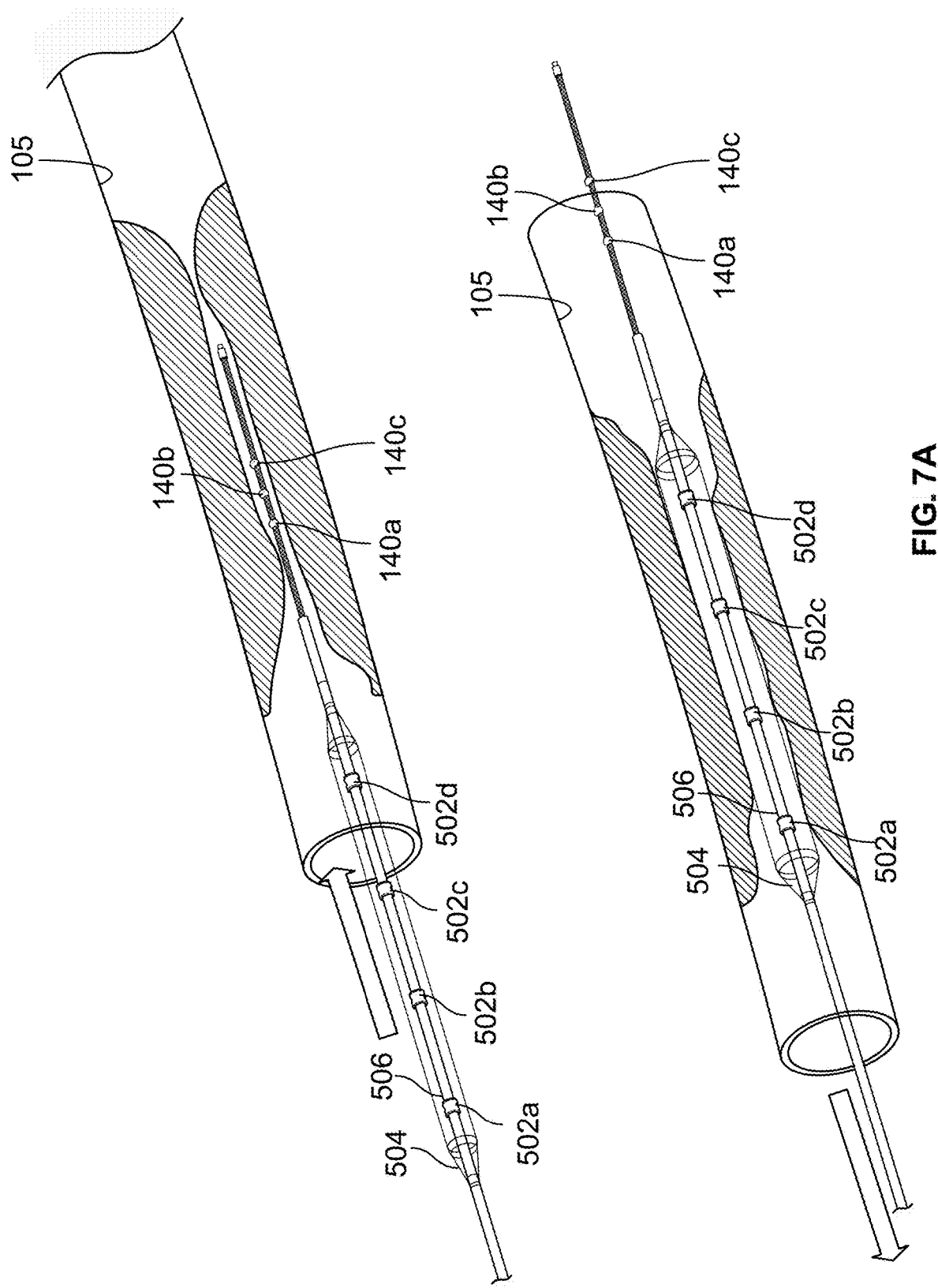
FIGS. 7A and 7B are perspective views of an example rotational atherectomy and lithotripsy device for the systems of FIGS. 5A and 5B.

Referring now to FIG. 6B, the inflated balloon 504 is shown with a generally cylindrical shape. However, in use inside of a stenotic lesion 107, the profile of the balloon 504 can conform to the shape of the interior of the stenotic lesion 107, for example as shown in FIG. 7A. When the lithotripsy emitters 502a-c are engaged, the lithotripsy emitters 502a-c generate acoustic energy that is transmitted through the conductive fluid in the sealed chamber 504 and through the wall of the balloon 504 to be delivered to the stenotic lesion 107. Due to the compliant shape of the balloon 504, the contact between the balloon 504 and the stenotic lesion 107 can be expected to be sufficient to successfully apply the acoustic energy to disrupt the stenotic lesion 107, thus providing successful lithotripsy to the stenotic lesion 107.

Referring now to FIG. 7A, the distal end portion of the drive shaft 136 is shown at a first time 700 and a second time 725 after the first time 700.

Initially at time 700, the rotational elements 140a-c are positioned inside of the stenotic lesion 107, which has a first shape. The drive shaft 136 is rotated, providing rotational atherectomy to the stenotic lesion 107. This rotational atherectomy reduces, but does not eliminate, the stenotic lesion 107 to a second shape.

After applying the rotational lithotripsy to the stenotic lesion 107 (e.g., after the time 700), the clinician can advance the drive shaft 137 so that the balloon 504 and lithotripsy emitters 502*a-d* pass through the stenotic lesion 107. For example, the subject may have more stenotic lesions 107 further in the blood vessel 105, and the clinician can advance the drive shaft 137 to first apply rotational atherectomy to each of those other lesions before applying the lithotripsy to any of the lesions. Then, once rotational atherectomy is completed for all lesions in the blood vessel, the clinician can apply lithotripsy 'on the way out' to each lesion in reverse order as the rotational atherectomy was applied.

Then at time 725, as the drive shaft 137 in being retracted through the blood vessel 105, (e.g., in response to the clinician pulling the actuator 116 rearward), the portion of the drive shaft 137 with the balloon 504 and the lithotripsy emitters 502*a-d* enters the stenotic lesion 107. The clinician can inflate the balloon to conform to the second shape of the stenotic lesion 107 and can engage the lithotripsy emitters (e.g., by pressing the electrical switch 106) to apply lithotripsy to the stenotic lesion 107.

Figure 7B:
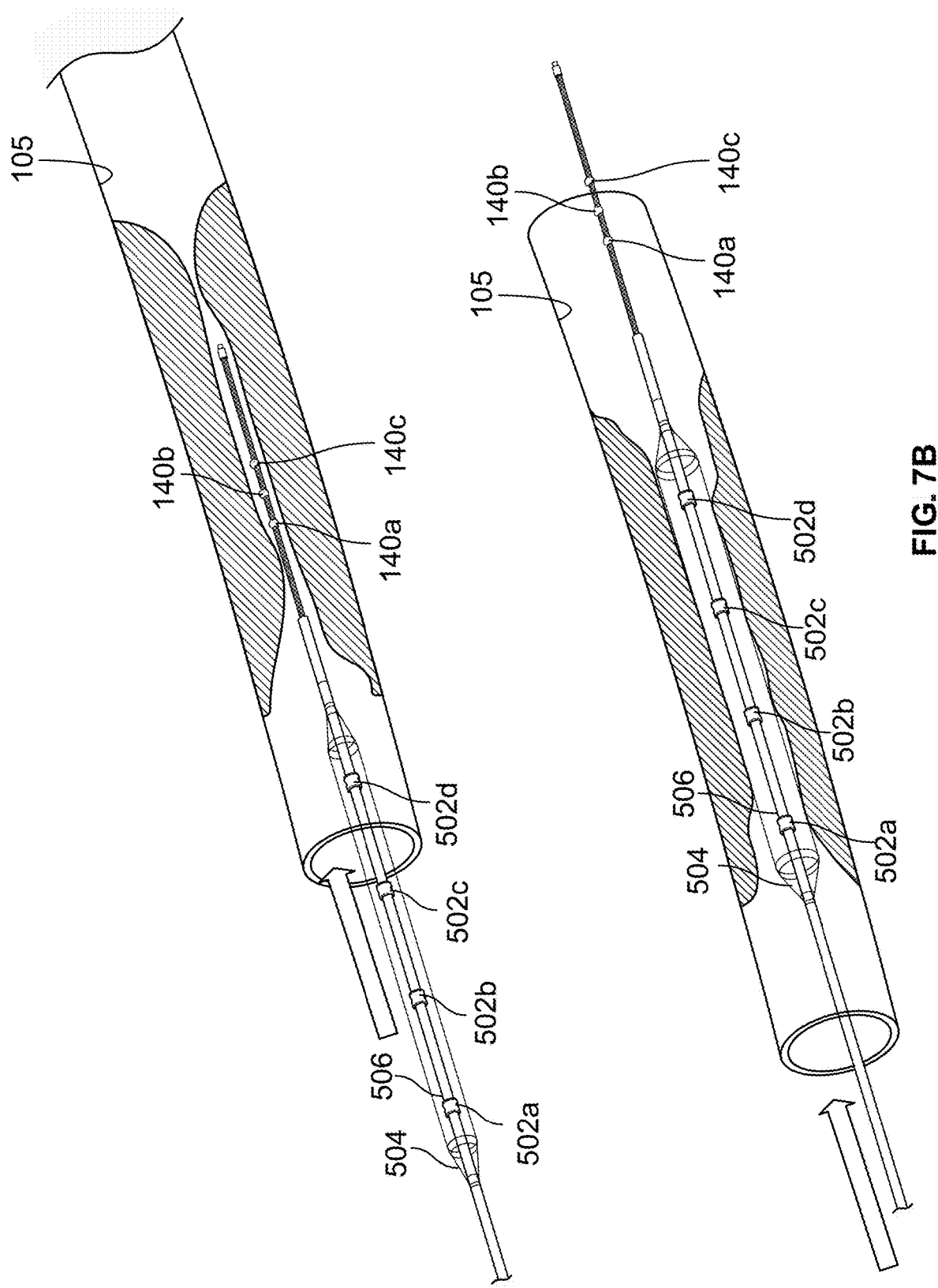

Referring now to FIG. 7B, the distal end portion of the drive shaft 136 is shown at a first time 750 and a second time 775 after the first time 750.

Initially at time 750, the rotational elements 140*a-c* are positioned inside of the stenotic lesion 107, which has a first shape. The drive shaft 136 is rotated, providing rotational atherectomy to the stenotic lesion 107. This rotational atherectomy reduces, but does not eliminate, the stenotic lesion 107 to a second shape.

At time 775, after applying the rotational lithotripsy to the stenotic lesion 107 (e.g., after the time 750), the clinician can advance the drive shaft 137 (e.g., in by pushing the actuator 116 forward) so that the balloon 504 and lithotripsy emitters 502*a-d* enter the stenotic lesion 107. The clinician can inflate the balloon to conform to the second shape of the stenotic lesion 107 and can engage the lithotripsy emitters (e.g., by pressing the electrical switch 106) to apply lithotripsy to the stenotic lesion 107.

What is claimed is:

1. A device for removing stenotic lesion material from an artery of a patient, the device comprising:
    an elongated flexible drive shaft defining a longitudinal axis and comprising a torque-transmitting coil of one or more filars;
    eccentric abrasive burrs fixedly mounted on a distal end portion of the torque-transmitting coil; and
    one or more lithotripsy emitters fixedly mounted on the distal end portion of the torque-transmitting coil, each of the lithotripsy emitters configured to selectively emit acoustic energy.

2. The device of claim 1, wherein at least one of the lithotripsy emitters is mounted to the torque-transmitting coil between two of the eccentric abrasive burrs.

3. The device of claim 1, wherein the eccentric abrasive burrs are coated with an abrasive media having a first grit.

4. The device of claim 3, wherein the lithotripsy emitters are coated with the abrasive media having the first grit.

5. The device of claim 3, wherein the lithotripsy emitters are coated with the abrasive media having a second grit.

6. The device of claim 3, wherein the lithotripsy emitters have a nonabrasive exterior surface.

7. The device of claim 3, wherein each of the lithotripsy emitters have a center of mass concentric with the longitudinal axis.

8. The device of claim 1, wherein each of the eccentric abrasive burrs has a center of mass offset from the longitudinal axis of elongated flexible drive shaft.

9. The device of claim 1, wherein the one or more filars of the torque-transmitting coil comprise:
    a first filar electrically coupled to anodes of each of the lithotripsy emitters;
    a second filar electrically coupled to cathodes of the lithotripsy emitters.

10. The device of claim 9, wherein the first filar is electrically insulated from the second filar.

11. The device of claim 1, wherein the device further comprises a pump for pumping conductive fluid into a balloon to inflate the balloon.

12. The device of claim 11, wherein the conductive fluid comprises saline and a contrast media.

13. A rotational atherectomy and lithotripsy device, comprising:
    an elongated flexible drive shaft defining a longitudinal axis and comprising a torque-transmitting coil of one or more filars;
    one or more abrasive burrs fixedly mounted on a distal end portion of the torque-transmitting coil; and
    one or more lithotripsy emitters configured to selectively emit acoustic energy and positioned proximate to the one or more abrasive burrs such that all of the one or more abrasive burrs and the one or more lithotripsy emitters are longitudinally advanceable together with the elongated flexible drive shaft.

14. The device of claim 13, wherein the one or more lithotripsy emitters are fixedly mounted on the distal end portion of the torque-transmitting coil such that all of the one or more abrasive burrs and the one or more lithotripsy emitters are longitudinally advanceable together with the elongated flexible drive shaft.

15. The device of claim 13, further comprising a sheath that surrounds at least a portion of the elongated flexible drive shaft and that carries an expandable balloon at a distal end of the sheath encapsulating the one or more lithotripsy emitters.

16. The device of claim 15, wherein the sheath and the drive shaft are configured to advance together over a guidewire, and the one or more lithotripsy emitters are fixedly mounted on the sheath such that all of the one or more abrasive burrs and the one or more lithotripsy emitters are longitudinally advanceable together with the elongated flexible drive shaft.

17. The device of claim 13, wherein the device further comprises a pump for pumping conductive fluid into the balloon to inflate the balloon.

18. The device of claim 17, wherein the conductive fluid comprises saline and a contrast media.

19. A device configured to apply both rotational atherectomy and lithotripsy, comprising:
    a control handle assembly;
    a torque-transmitting coil extending distally from the control handle assembly;
    one or more abrasive burrs fixedly mounted on a distal end portion of the torque-transmitting coil; and
    one or more lithotripsy emitters positioned proximate to the one or more abrasive burrs, wherein the control handle assembly is configured to activate rotation of the one or more abrasive burrs at a targeted arterial site and to activate the one or more lithotripsy emitters to output acoustic energy at the targeted arterial site.

20. The device of claim 19, wherein:
    at least one of the one or more lithotripsy emitters is mounted to the torque-transmitting coil proximate to at least one of the one or more abrasive burrs, the one or more abrasive burrs and the one or more lithotripsy emitters are coated with an abrasive media having a first grit, and the one or more filars of the torque-transmitting coil comprise:
- a first filar electrically coupled to anodes of each of the lithotripsy emitters; and
- a second filar electrically coupled to cathodes of the lithotripsy emitters, wherein the first filar is electrically insulated from the second filar.

* * * * *